United States Patent
Kaul et al.

(10) Patent No.: US 9,894,540 B2
(45) Date of Patent: Feb. 13, 2018

(54) OPTIMISATION OF A CELLULAR RADIO NETWORK

(71) Applicant: VODAFONE IP LICENSING LIMITED, Newbury, Berkshire (GB)

(72) Inventors: Anjulika Kaul, Newbury (GB); Assen Mahaboob Khan Golaup, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 56 days.

(21) Appl. No.: 14/977,327

(22) PCT Filed: Jun. 24, 2014

(86) PCT No.: PCT/GB2014/051925
§ 371 (c)(1),
(2) Date: Dec. 21, 2015

(87) PCT Pub. No.: WO2014/207447
PCT Pub. Date: Dec. 31, 2014

(65) Prior Publication Data
US 2016/0165461 A1   Jun. 9, 2016

(30) Foreign Application Priority Data
Jun. 24, 2013  (GB) .................................. 1311195.0

(51) Int. Cl.
*H04W 24/04* (2009.01)
*H04W 24/02* (2009.01)
(Continued)

(52) U.S. Cl.
CPC ........... *H04W 24/02* (2013.01); *H04W 24/04* (2013.01); *H04W 28/0284* (2013.01); *H04W 84/18* (2013.01)

(58) Field of Classification Search
CPC ..... H04W 24/02; H04W 24/04; H04W 84/18; H04W 28/0284
See application file for complete search history.

(56) References Cited

U.S. PATENT DOCUMENTS 9,100,832 B2 *   8/2015   On .................... H04W 16/10
9,535,808 B2 *   1/2017   Bates ................. G06F 11/0709
(Continued)

FOREIGN PATENT DOCUMENTS

WO   WO2012/079856 A   6/2012
WO   WO2012/105881 A   8/2012

OTHER PUBLICATIONS

Intellectual Property Office Search Report for GB1311195-0 dated Dec. 23, 2013.
(Continued)

*Primary Examiner* — Edan Orgad
*Assistant Examiner* — Ivan O Latorre
(74) *Attorney, Agent, or Firm* — Workman Nydegger (57) ABSTRACT

Self-optimization for a base station within a cellular radio network is provided. The base station has a first communication interface for providing a service to mobile terminals and a second communication interface for communication with other network entities of the cellular radio network. A degradation in performance of the service provided over the first communication interface is detected. A reliability level for the second communication interface is identified and a Self-Organizing Network (SON) algorithm is implemented in dependence on the identified reliability level and in response to the detection of degradation.

15 Claims, 3 Drawing Sheets

(51) Int. Cl.
*H04W 28/02* (2009.01)
*H04W 84/18* (2009.01)

(56) References Cited

U.S. PATENT DOCUMENTS

| | | | | |
|---|---|---|---|---|
| 2004/0218548 | A1* | 11/2004 | Kennedy | H04L 1/1685 370/254 |
| 2009/0059816 | A1 | 3/2009 | Reza et al. | |
| 2009/0257353 | A1* | 10/2009 | Song | H04W 24/02 370/241 |
| 2010/0165857 | A1* | 7/2010 | Meylan | H04L 12/2602 370/252 |
| 2010/0216467 | A1* | 8/2010 | Ryan | H04W 24/04 455/435.1 |
| 2012/0157089 | A1* | 6/2012 | Yang | H04L 12/2464 455/424 |
| 2012/0252440 | A1* | 10/2012 | Watanabe | H04W 24/02 455/423 |
| 2012/0264470 | A1* | 10/2012 | Bajj | H04W 84/045 455/509 |
| 2012/0295609 | A1* | 11/2012 | Li | H04W 24/04 455/423 |
| 2013/0003534 | A1* | 1/2013 | Henry | H04W 40/00 370/228 |
| 2013/0021933 | A1 | 1/2013 | Kovvali et al. | |
| 2013/0097304 | A1* | 4/2013 | Asthana | H04L 41/5025 709/224 |
| 2014/0126356 | A1* | 5/2014 | Lee | H04L 41/0663 370/228 |
| 2014/0160939 | A1* | 6/2014 | Arad | H04L 47/122 370/237 |
| 2014/0317461 | A1* | 10/2014 | Li | H04W 24/04 714/712 |
| 2014/0355484 | A1* | 12/2014 | Foster | H04W 24/02 370/255 |
| 2015/0050925 | A1* | 2/2015 | Tapia | H04W 24/04 455/418 |
| 2015/0146621 | A1* | 5/2015 | Zhang | H04W 48/20 370/328 |
| 2015/0146675 | A1* | 5/2015 | Zhang | H04L 41/082 370/329 |
| 2015/0181494 | A1* | 6/2015 | Zhang | H04W 24/02 370/331 |
| 2015/0365959 | A1* | 12/2015 | Coldrey | H04W 24/04 370/252 |

OTHER PUBLICATIONS

International Search Report for PCT/GB2014/051925 dated Oct. 17, 2014.
"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 3GPP Draft; S5-123181 JWG RAM Changes 32522 to 28628 SON Policy NRM IRP IS_REVMARKSs 3rd Generation Partnership Project (3GPP), Mobile Competence Centre ; 650, Route Des Lucioles ; F-06921 Sophia-Anti Nov. 20, 2012 (Nov. 20, 2012), XP05O689614, Retrieved from the Internet: URL:http://www.3gpp.org/ftp/tsg_sa/W65_TM/ TSGS5_86/Docs/ [retrieved on Nov. 20, 2012] paragraph [0004].
"3rd Generation Partnership Project; Technical Specification Group Services and System Aspects; Telecommunication Management; Self-Organizing Networks (SON) Policy Network Resource Model (NRM) Integration Reference Point (IRP); Requirements (Release 11)", 3GPP Standard; 3GPP TS 28.627, $3^{rd}$ Generation Partnership Project (3GPP), Mobile Competence Centre ; 650, Route Des Lucioles ; F-06921 Sophia-Antipolis Cedex; France, vol. SA WG5, No. VI.0.0, Dec. 10, 2012 (Dec. 10, 2012), pp. 1-26, XP050690925,[retrieved on Dec. 10, 2012] paragraph [0006].

* cited by examiner

OPTIMISATION OF A CELLULAR RADIO NETWORK

CROSS REFERENCE TO RELATED APPLICATIONS

This application is a U.S. Nationalization of PCT Application Number PCT/GB2014/051925, filed on Jun. 24, 2014, which claims priority to GB Patent Application No. 1311195.0, filed on Jun. 24, 2013, the entireties of which are incorporated herein by reference.

TECHNICAL FIELD OF THE INVENTION

The invention concerns a method of self-optimisation for a base station within a cellular radio network and a corresponding base station of a cellular radio network.

BACKGROUND TO THE INVENTION

Cellular networks, particularly those specified by the Third Generation Partnership Project (3GPP) have developed the concept of a Self-Organising (or Optimising) Network (SON). These are also known as self-healing networks.

This concept allows the automated optimisation of network parameters, especially those of the Radio Access Network (RAN), in order to improve at least one Key Performance Indicator (KPI). The principles relating to SON functionality are specified in the Third Generation Partnership Project (3GPP) Technical Specification (TS) 36.300. Use cases are described in 3GPP Technical Report (TR) 36.902.

Most of the details for the SON algorithm is left to vendor implementation, but some interfacing specifications are standardised. For example, 3GPP TS 36.423 specifies the signaling over the LTE (Long Term Evolution) X2 interface to exchange or transfer parameters required by SON algorithms. Also, 3GPP TS 36.331 specifies parameters transferred over the LTE air interface by terminals for SON purposes. 3GPP have also specified the management framework for SON e.g. as detailed in TS 32.541; 3GPP TS 32.521; 3GPP TS 32.501; and 3GPP TS 28.628.

Although network operators have previously checked KPIs and scheduled optimisation activities in order to improve them, this has been a manual process in view of the complexity of the network and the relationship between the network parameters and KPIs. One such KPI is the Call Drop Rate (CDR). When this exceeds a certain value, it becomes a particular issue for network operators and requires immediate attention, due to the resultant customer dissatisfaction.

Various parameters affect the KPIs. The current focus of the SON concept relates to the optimisation of handover parameters to improve the robustness of handovers between cells of different base stations (for example, LTE eNodeBs). Improvement in handover performance has a direct impact on the call drop rate as a User Equipment (UE) moves between cells in the network. Handover optimisation using SON algorithms relies on parameters exchanged between neighbouring eNodeBs (eNBs) following a failure of the radio link. For example, this may take place immediately before the handover (too late handover), immediately after a successful handover (too early handover) or after reconnection to a cell other than the target cell where the handover occurred (handover to wrong cell).

The SON algorithm uses information exchanged on the X2 interface to decide on the need to change Radio Access Network (RAN) parameters. For example, this may include modifying the "time to trigger" parameters or hysteresis parameters. These may be indicated to a UE using broadcast signaling or by dedicated means. In this way, an SON algorithm can improve the success rate of subsequent handovers between the optimised cells and thus improve the overall network KPI. For existing SON algorithms to perform effectively, the handover failures should be the result of the non-optimised RAN parameters, rather than any external factors that cannot be improved by changing these RAN parameters.

One such external factor that can result in poor handover performance is the reliability of the backhaul (or backbone) interface between base stations, for instance those over which the X2 protocol for handover runs between eNBs in LTE. Backhaul interfaces are used for communication by each base station with other network entities of the cellular radio network. Typically, the transport link between base stations uses microwave communication which has a certain element of unreliability due to varying radio conditions.

Moreover, US-2012/157089 observes that the network KPIs may be adversely impacted when the performance of backhaul interfaces degrades or fails. They further observe that SON mechanisms, such as cell outage compensation, can compensate for such degradation or failure by adjustment of the RAN parameters and therefore the degradation or failure can go unnoticed for a long period of time. To avoid backhaul failures going undetected, US-2012/157089 suggests methods for identifying these problems using a Network Management System (NMS). Automatic detection of an outage, high error rate or both, due to backhaul failures, can then be performed and these issues can be resolved independently from the SON compensation processes in the RAN, as needed.

Even if this technique could identify and resolve backhaul failure issues automatically, it could only address the case where there are permanent failures in the backhaul connection. For example, these may be caused by faulty hardware or obstruction in the radio path. However, it could not address the problem caused by intermittent degradation of the backhaul connection quality.

SUMMARY OF THE INVENTION

Against this background, the present invention provides a method of self-optimisation for a base station within a cellular radio network that intrinsically takes into consideration the performance of the backhaul.

In a first aspect, the present invention provides a method of self-optimisation for a base station within a cellular radio network. The base station has a first communication interface for providing a service to mobile terminals and a second communication interface for communication with other network entities of the cellular radio network. The method comprises: detecting a degradation in performance of the service provided over the first communication interface; identifying a reliability level for the second communication interface; and implementing a network optimisation procedure using a Self-Organising Network, SON, algorithm in dependence on the identified reliability level and in response to the detection of degradation.

This recognises that service degradation may be the consequence of factors other than non-optimised Radio Access Network (RAN) parameters. For example, degradation may result from backhaul interface outage or degradation due to varying radio conditions. For example, this can result in intermittent loss of X2 signaling that is used to enable seamless mobility between neighbouring cells. As a result, this can cause overall degradation of network KPIs.

In particular, the SON algorithm may be implemented with knowledge about the backhaul interface (in particular, conditions of the interface at the time of a failure) and can take this into account upon its operation. The self-optimisation of the invention may be of radio (RAN) parameters, especially those relevant for handover. SON algorithms are intended to organise and optimise networks and this new approach advantageously brings information related to the physical connectivity of the base station to other network entities (such as other base stations) into the algorithm. This may allow the algorithm to make a decision on the optimisation of radio network parameters accordingly. Then, when the SON algorithm evaluates the network for optimisation, it may identify that one or more sites (that is, base stations) had an issue with their transmission at the time of reported failures intended as input to the SON algorithm. They may then establish that their degraded performance is not due to their RAN parameters at this point in time.

US-2012/157089 focuses on identifying and resolving issues with permanent failures on the backhaul rather than incorporating the identification of such failure events into the implementation of the SON algorithm. This may lead to further degradation of network performance, if already optimised RAN parameters are adjusted on an incorrect assumption, especially the assumption that the degradation in performance is caused by the RAN when it is in fact caused by the backhaul interface. As a result, this optimisation may not be needed in the first place or if done, it may not solve the actual problem with the network. This can result in large processing requirements involving network resources, which may cause further congestion in the network.

The invention may now be explained with further details. It is likely that in the presence of an unreliable backhaul link, the handover performance of the network will deteriorate due to failed signaling between base stations involved in the handover. Any SON algorithm implemented by a base station should desirably be aware of which handovers failed due to inability to complete the signaling over the backhaul interface (such as an X2 interface) to perform the handover. In such situations, the UE will likely experience radio link failure and will subsequently reconnect to the cell towards which it was being handed over. A base station receiving a radio link failure report from a UE may evaluate the failure and identify that the handover was 'too late'. Consequently, a SON algorithm acting on this information may choose to adjust the RAN parameters in order to improve the handover performance. Such adjustment is unnecessary though.

Instead, it is desirable that the SON algorithm is aware of the occurrence of failed signaling on the backhaul between base stations during handover and be able to corroborate this information with information of radio link failures received as SON reports from the UE.

Preferably, the SON algorithm identifies that a radio link failure was due to a failure on the backhaul rather than due to mistuned RAN parameters. Then, the SON algorithm may abstain from unnecessarily changing those parameters to improve the handover performance of the radio network.

Identifying the status of the backhaul link as a precursor to the implementation of a SON algorithm therefore improves the algorithm and may allow them to take decisions that do not involve excessive and unnecessary network processing. This may also be desirable when the SON algorithm is required to run in real-time. Here, the algorithm may need to take a decision on whether or not to include certain base stations into their optimisation process that are not as important compared to other base stations. Knowledge of the base station backhaul connectivity can allow the SON algorithm to prioritise or ignore such base stations accordingly.

Preferably, the detection of a degradation in performance of the service provided over the first communication interface is achieved by monitoring at least one Key Performance Indicator (KPI). More specifically, the optimisation of parameters relating to the backhaul communications interface may also provide KPI improvements.

The backhaul (or backbone) interfaces (such as the X2 interface in LTE) typically use a range of different technologies in terms of physical transmission. These may include: optical fibre; copper wire; and wireless, particularly microwave transmission. If the base station only uses an optical fibre link, the probability of error in the transmission link will be low and therefore have a low effect on KPIs. The reliability level for this communication interface will therefore be consistently high and no corrective measure may be required. Other types of communication interface may be subject to intermittent outage or error. By recognising that such other types of interface, including a wireless (and especially microwave) link, may be used for this backhaul communication interface, it can further be established that the reliability level for such a communication interface may not be high. In particular, the link can be active whilst still having intermittent errors. In other words, the link may have an error rate (such as a bit error rate) that can be non-negligible but still provide an operative communications interface. In this case, the link may not be disconnected, but the poor link quality may result in lost signaling messages and consequently affect the KPIs of the base station that uses it.

Advantageously, the step of implementing the SON algorithm comprises establishing a corrective measure for the degradation in performance. This corrective measure may form part of the SON algorithm or it may precede implementation of the SON algorithm. Various examples of ways to establish a corrective measure will be discussed below.

Preferably, the step of identifying the reliability level for the second communication interface comprises determining a communications technology used for the second communication interface. As noted above, the reliability level may be largely dependent on the type of technology used. A microwave link may be much less reliable than a copper link, which may also be less reliable than an optical fibre link. In particular, the step of determining a communications technology used for the second communication interface may comprise determining the communications technology used for the second communication interface is wireless. More specifically, the step of determining a communications technology used for the second communication interface may comprise determining that the communications technology used for the second communication interface is microwave, and especially point-to-point microwave. Microwave links tend to get affected by environmental conditions. For example, strong wind and rain may cause these links to fluctuate, often without resulting in a complete outage. This may lead to a degradation of performance and increased failure reports being generated as input to the SON algorithm and the resultant problems discussed above.

The identification of a reliability level for the second communication interface may be done in a number of different ways. For example, the step of identifying a reliability level for the second communication interface may comprise checking a communication status of the second communication interface. This status may be as simple as either: connected; or disconnected. More preferably though, the step of checking the communication status of the second communication interface may comprise determining a quality parameter of the second communication interface. The quality parameter may comprise: (i) an indicator of outage; or (ii) an error rate (BER) of the second communication interface. Other types of performance measurement can additionally or alternatively be used, for example, delay, delay variation or other quality of service parameters. The step of identifying a reliability level for the second communication interface may comprise monitoring a status (such as connected, disconnected) or parameter (such as outage or error rate) of the second communication interface. The monitored status or parameter is advantageously stored (beneficially, with time information). Additionally or alternatively, the time of any failure event (in which the status or parameter does not meet an predetermined acceptable level) may be stored.

Although the identification of the reliability level is typically carried out in response to the detection of degradation, the information used in making this identification may be generated at the time of identification or previously. In embodiments, the reliability level may be based on historic information regarding the second communication interface. This will be discussed further below.

The identification of the reliability level may be carried out before performing optimization of KPIs of the base station. In particular, the step of checking the communication status of the second communication interface may comprise identifying an outage of the second communication interface, determining that an error rate for the second communication interface meets a predetermined threshold or both. The error rate may be one of a: bit error rate; packet error rate; word error rate; or similar.

The SON algorithm may evaluate whether a problem or failure event (for example, a radio link failure or handover failure) is a result of a problem or failure on the second communications interface, before attempting to modify any radio parameters to optimise the network. The SON algorithm may then attempt to modify said parameters only for problems or failure events where the second communications interface was evaluated as not being the cause of the failure. If the second communications interface is identified as a possible cause for the problem or failure event, radio link and handover failure reports sent at the time when the backhaul link performance was inadequate may be omitted as input to the SON algorithm. Especially if the backhaul problem is identified as more permanent (that is, a failed backhaul link), the second communications interface may be reset, substituted by a different interface for communication with other network entities of the cellular radio network or both, preferably before adjusting any RAN parameters. Other corrective measures may be possible.

Optionally, when the step of checking the communication status of the second communication interface comprises identifying an outage of the second communication interface, the step of establishing a corrective measure for the degradation in performance may comprise re-routing the second communication interface. In other words, an alternative backhaul interface may be provided. This may precede operation of the SON algorithm or it may form part of the SON algorithm.

Alternatively, when the step of checking the communication status of the second communication interface comprises determining that an error rate for the second communication interface meets a predetermined threshold, the step of establishing a corrective measure for the degradation in performance may comprise resetting the second communication interface. Additionally, the step of establishing a corrective measure for the degradation in performance may further comprise establishing a new error rate for the second communication interface, relating to a time period subsequent to the resetting of the second communication interface. For example, this may be achieved by resetting an error rate counter subsequent to the step of resetting the second communication interface. The step of establishing a corrective measure for the degradation and performance may further comprise re-routing the second communication interface if the new error rate for the second communication interface does not meet a predetermined threshold. In some embodiments, this predetermined threshold is the same as the predetermined threshold against which the initial error rate is compared. Optionally, a different predetermined threshold may be used. Again, any one or more of these steps for establishing a corrective measure may precede operation of the SON algorithm or they may form part of the SON algorithm.

Beneficially, the step of implementing the SON algorithm comprises optimisation of one or more parameters of the first communication interface. In other words, at least one parameter of the base station's Radio Access Network (RAN) may be optimised. Additionally or alternatively, the step of implementing the network optimisation comprises using the identified reliability level as an input to the SON algorithm. In this way, knowledge about the backhaul link quality, type or both can be used to improve the optimisation, including possibly improving optimisation of the RAN parameters. This may be used, for instance, if the degradation in performance cannot be associated with an inadequate backhaul performance. The identified reliability level may be collected over a time period associated with other inputs to the SON algorithm, such as radio link or handover failure reports.

In some embodiments, the step of detecting a degradation in performance of the service provided over the first communication interface comprises identifying a report of a failure in respect of the first communication interface at a first time (the first time being the time of the failure). This may be a radio link failure report, for example, that could be provided by a mobile terminal. The mobile terminal may begin a timer when communicating a handover request message, in order to provide this report, for instance. Advantageously, the step of checking a communication status of the second communication interface comprises identifying a report of a failure of the second communication interface at a second time (which may have been received previous to the step of checking). (Again, the second time may be understood as the time of the failure.) In these cases, the method may further comprise comparing the first time and the second time in order to identify that the failure of the second communication interface was a cause of the failure of the first communication interface. This may be because the first and second times are the same or differ by no more than a predetermined variation. Then, the step of implementing a network optimization procedure is beneficially carried out on the basis of the identification that the failure of the second communication interface was a cause of the failure of the first communication interface. For example, the identification may be used as an input to the SON algorithm. In embodiments, the SON algorithm may be implemented not to adjust the RAN parameters on the basis of this identification (that the RAN failure was caused by a backhaul link failure).

In some embodiments, the step of detecting a degradation in performance of the service provided over the first communication interface comprises one or more of: monitoring a Radio Access Bearer (RAB) establishment rate; and monitoring a Call Drop Rate (CDR), especially during handovers. Each of these may be an example of a Key Performance Indicator (KPI). Further KPIs may be monitored alternatively or additionally, particularly those relating to the RAN.

In the preferred embodiment, the cellular radio network has a Long Term Evolution (LTE) architecture. Then, a base station is an eNodeB. Other cellular radio network architectures may be used, however, including GSM or UMTS. The cellular radio network may also comprise a combination of architectures.

In another aspect, the present invention provides a computer program configured to carry out the method as described herein when operated by a processor. The invention may further provide a network entity configured to carry out the method as described herein. Programmable logic or other kinds of control logic configured to operate in accordance with the method as described herein may also be provided.

In a further aspect, there is provided a base station of a cellular radio network, comprising: a first communication interface for providing a service to mobile terminals; a second communication interface for communication with other network entities of the cellular radio network; and a processor. The processor may be configured to detect a degradation in performance of the service provided over the first communication interface, identify a reliability level for the second communication interface (for instance, over a monitoring time) and implement a network optimisation procedure using a Self-Organising Network (SON) algorithm in dependence on the identified reliability level and in response to the detection of degradation. Optionally, the processor may be further adapted to establish a corrective measure for the degradation in performance, preferably based on the identified reliability level.

It will be further understood that apparatus or structural features configured to carry out any of the method steps described herein may also be provided. Moreover, a combination of any particular features from within one aspect or between aspects is also provided, even if not explicitly disclosed.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 1:
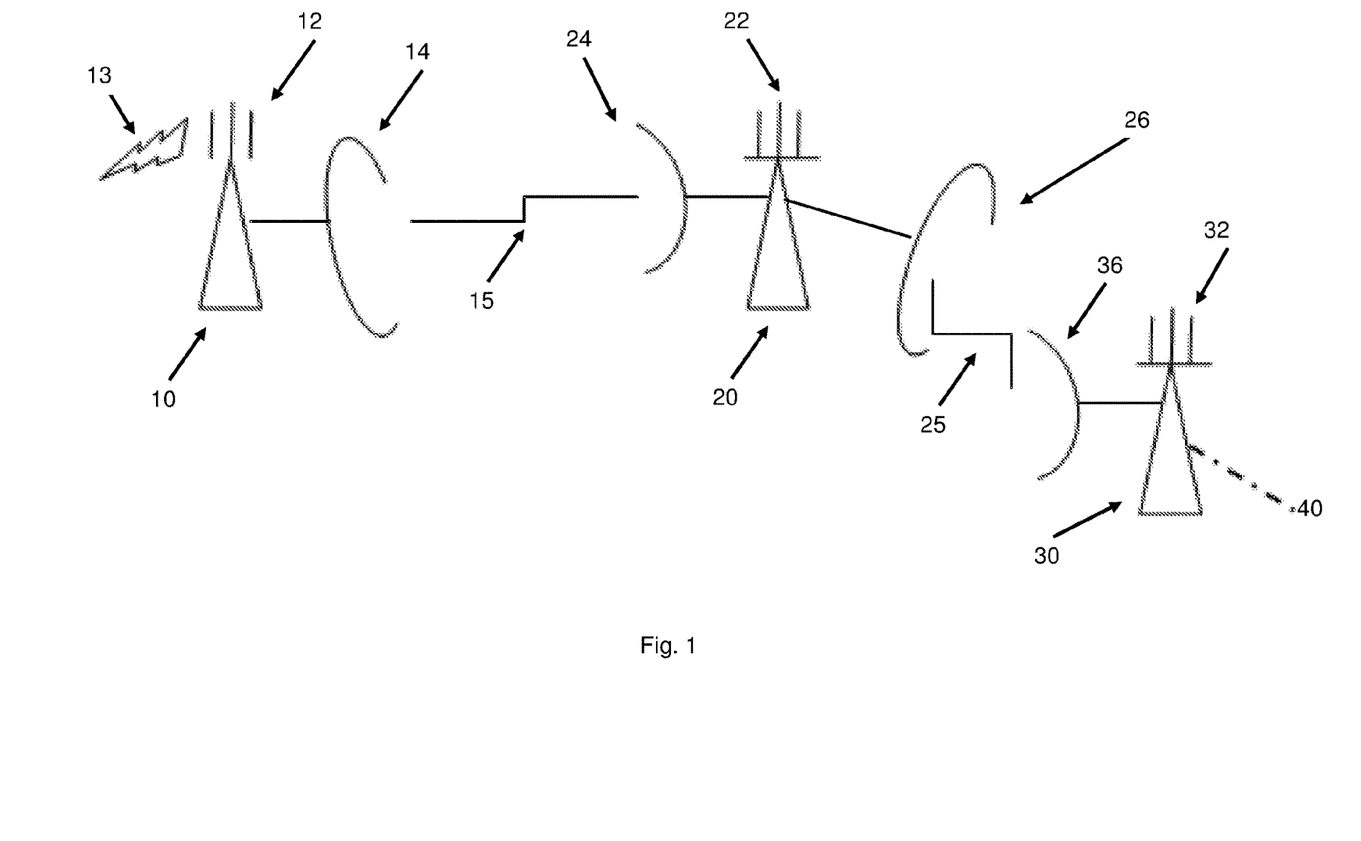
FIG. 1 shows a schematic diagram of base stations forming a part of a cellular network.

Referring first to FIG. 1, there is shown a schematic diagram of base station forming part of a cellular network.

In particular, there is shown: a first base station 10; a second base station 20; and a third base station 30. Each of the first base station 10, second base station 20 and third base station 30 may be base stations for a particular cellular radio network architecture. For example, these may include: GSM, where the base station is termed a Base Transceiver Station (BTS); UMTS, where the base station is termed a Node B; and LTE, where the base station is termed eNodeB.

The first base station has an RF antenna 12 and a microwave communication device 14. The RF antenna 12 provides RF coverage to mobile stations (UEs). The second base station 20 has an RF antenna 22 and a microwave communication device 24. The RF antenna 22 provides local coverage for mobile stations in the coverage area of the second base station 20. A microwave link 15 allows communication between the first base station 10 using the microwave communications device 14 and the second base station 20 using the microwave communications device 24. The second base station 20 also has a further microwave communications device 26. The third base station 30 has an RF antenna 32 and a microwave communications device 36. The further microwave communications device 26 of the second base station 20 is configured to communicate via microwave link 25 with the microwave communications device 36 of the third base station 30. The RF antenna 32 provides local RF coverage for mobile stations in the vicinity of the third base station 30. The third base station 30 also has a further link 40 providing communications to the core network of the cellular radio network.

The RF antenna 12 of the first base station 10, RF antenna 22 of the second base station 20 and RF antenna 32 of the third base station 30 may provide 2G, 3G or 4G coverage. More than one type of service coverage can be provided by some base stations. The various microwave communications devices and microwave links provide transmission connectivity between the various base stations, thereby playing an integral part in providing network coverage.

Existing SON solutions do not take into consideration the nature, status or performance of the backhaul interface, such as the various microwave links used by the base station shown in FIG. 1. It will immediately be apparent that the possibility of outage or error above a specific threshold can have a significant effect on the KPIs of the individual base stations, particularly reflecting the performance of the RF coverage provided.

Degradation in error rate (such as Bit Error Rate, BER) may not raise critical alarms on the NMS and may be treated with less importance by a network engineer. When SON algorithms are applied, the capability exists to work at different lows simultaneously. Advantageously, it has been recognised that a SON algorithm may provide a suitable way to include a check on the backhaul interface. Existing SON algorithms are focused only on RAN issues and consider backhaul interfaces to be entirely separate.

Figure 2:
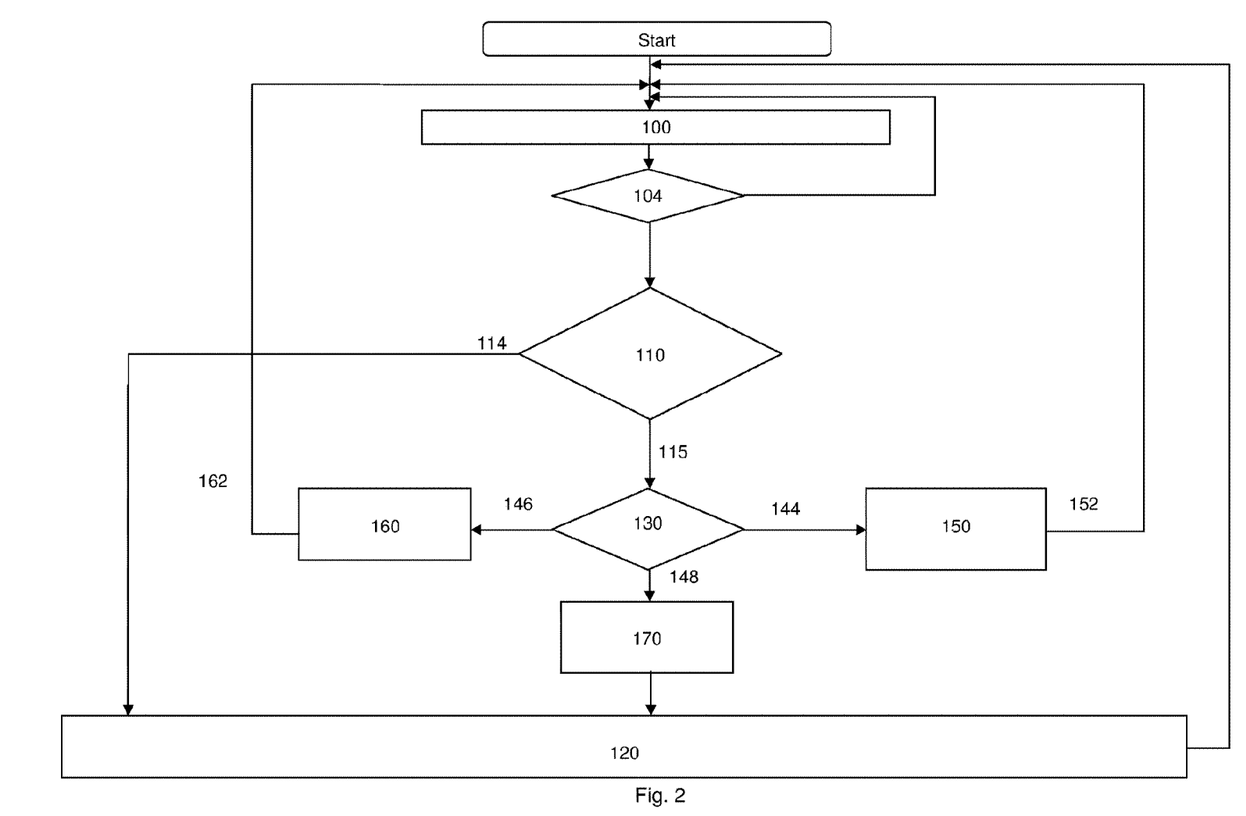
FIG. 2 illustrates a flowchart showing a method for self-optimisation at a base station, such as those shown in FIG. 1.

Referring now to FIG. 2, there is illustrated a flowchart showing a method for self-optimisation at a base station, such as those shown in FIG. 1.

At a monitoring step 100, KPIs of a base station are monitored. If KPIs are assessed as not degraded according to a first detection step 104, the algorithm returns to monitoring step 100. If KPIs are assessed as degraded according to the first detection step 104, the algorithm proceeds to first checking step 110, which identifies whether there is an associated microwave link. If not, the algorithm proceeds along route 114 to continuation step 120, in which the radio access network optimisation is carried out. If a microwave link is present, route 115 is taken and in a second detection step 130, the status of any microwave links is then determined.

Detection step 130 can have three outcomes. A first outcome is that the microwave link is in outage, in other words, that it is completely not working. If an outage is detected, the algorithm proceeds along route 144 to continuation step 150. In this step, the connectivity via the respective microwave link is re-routed, if possible, and an alarm is raised. Such an alarm informs the SON algorithm of the issue with connectivity in this case. Then, the algorithm returns to monitoring step 100 along path 152 and the KPIs for the base station are reassessed. There is typically a delay prior to reassessment (for example, 5 to 10 minutes) to allow the system to return to normal following the corrective measures applied.

First detection step 110 follows in a second run. If the KPIs are still not acceptable following the corrective measures applied in continuation step 150, the algorithm optionally checks again for the presence of a microwave backhaul in first checking step 110. If the backhaul is now present (or first checking step 110 is skipped in the second run), the algorithm returns along route 115 to second detection step 130, where the condition of the backhaul is again assessed. In this second run, the backhaul condition is not likely to be in outage but may have a high bit error rate (in which case it proceeds along route 146 to step 160, as described below) or no issues with the backhaul (in which case it proceeds along route 148 to step 170, again as described below).

A second outcome of the detection step 130 is that a high bit error rate is detected. Then, the algorithm proceeds along route 146 to continuation step 160. In continuation step 160, the link is reset and the bit error rate counter is refreshed. A second bit error rate measurement is now taken and if this is still unacceptable, the connectivity is re-routed and an alarm is raised for the microwave link. After continuation step 160, the algorithm returns to step 100 along route 162 and the KPIs for the base station are reassessed. Again, the process proceeds through first detection step 110 (optionally) and first checking step 130. In this second run, it is likely that outcome will be to proceed along route 148 to identification step 170, as described below, if the condition of high bit error rate has been fixed and no outage has occurred on the backhaul during the re-evaluation period.

A third outcome of step 130 is that no outage or high error rate is detected on the backhaul links at the time of evaluation. In this case, the algorithm proceeds along route 148 to identification step 170 which attempts to identify whether any of the failure reports to be used as an input to the SON algorithm (in step 120), could be linked to a failure event on the backhaul link at the time of the failure. In other words, a failure event may have occurred but has been rectified (possibly without intervention) and could otherwise explain the degradation in KPIs, even though the current status of the backhaul link does not show outage or a high error rate.

Figure 3:
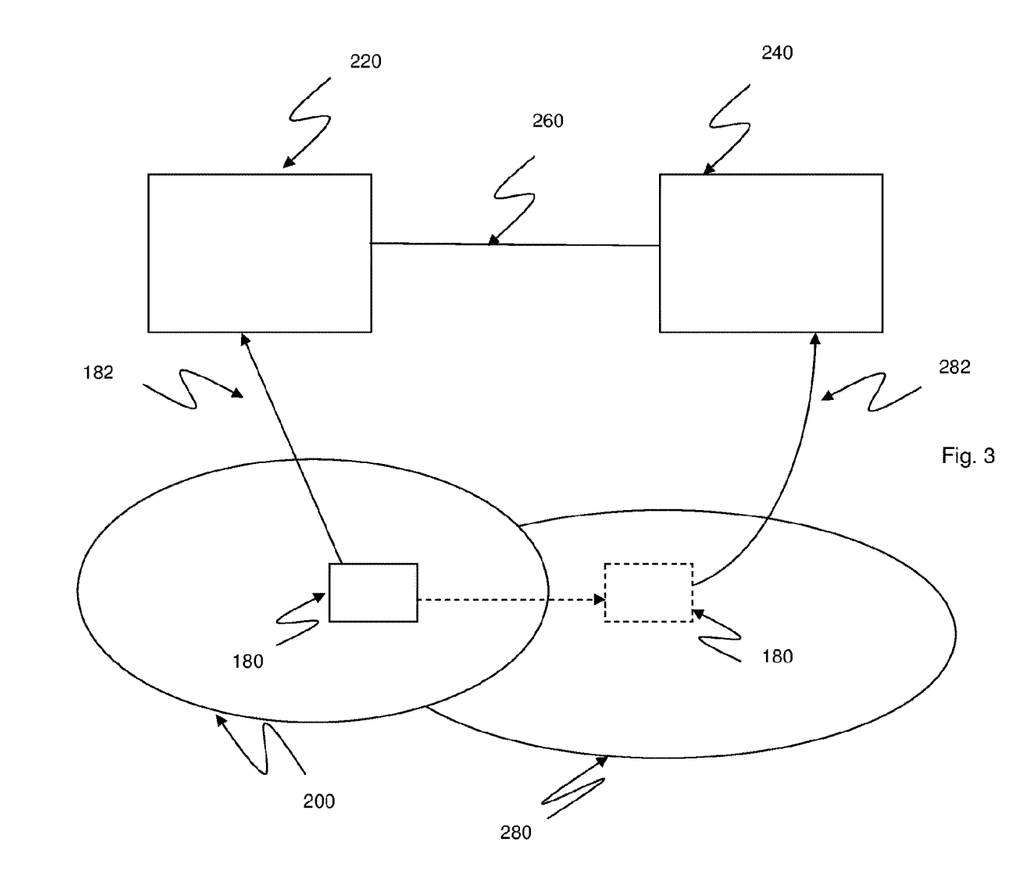
FIG. 3 depicts a schematic diagram of an example cellular network, for illustrating the operation of the method of FIG. 2.

Referring next to FIG. 3, there is shown a schematic diagram of an example cellular network. This will be used to explain the operation of the flowchart in FIG. 2. In particular, it can show how this algorithm can determine whether failure reports used as input to the SON algorithm are related to historic failure events on the backhaul link connecting the relevant base stations. In FIG. 3, there is shown: a first cell 200, under the control of a first base station 220; a second cell 280, under the control of a second base station 240; a UE 180 that moves from the first cell 200 to the second cell 280; and an interface 260 between the first base station 220 and the second base station 240.

The UE 180 is initially within in the first cell 200 which acts as a serving cell under the control of the first base station 220. The first base station 220 connects to the second base station 240 over the interface 260 (which uses microwave as the transport link).

The UE 180 sends a measurement report 182 to the serving first base station 220 and starts a timer. The serving first base station 220 records the time at which a measurement report 182 (which is effectively a request for handover) is received from the UE 180. It then sends a handover preparation message to the second base station 240 over interface 260 and also starts a timer.

However, there is a temporary failure on the interface 260 providing the backhaul link between the first base station 220 and the second base station 240. As a result, the handover preparation message is lost over interface 260. Alternatively (and without changing the result), the response message from the second base station 240 to the first base station 220 is lost, due to a temporary failure on the interface 260 providing the backhaul transport link. As a consequence, the timer started by the serving first base station 220 expires. The serving first base station 220 then sends a handover cancel message to the second base station 240 to remove any so-called 'hanging configuration'. This message may or may not be successfully delivered depending on whether the backhaul link provided by interface 260 has recovered from the temporary failure.

In the meantime, the UE 180 leaves the coverage of the first cell 220 into coverage of the second cell 280 and suffers a radio link failure. The UE 180 keeps a report of the failure, including: information about the time that has elapsed since it sent the request for handover to the serving base station (using the timer that it previously initialised); the identity of the previous serving first cell 200; and advantageously, the identity given to the UE 180 under the serving first cell 200.

Then, the UE 180 connects (attaches) to the second cell 280 and sends a report of the failure 282 to the second base station 240. The second base station 240 identifies that the UE 180 was previously connected to the first cell 200 or the first base station 220 and forwards a failure report to the base station 220. This failure report will serve as input to a SON algorithm running at the first base station 220.

The SON algorithm keeps a log of failure events on the backhaul interface 260 with a time, or it records events (with time information) when it had to send handover cancel message due to lack of response to a handover preparation request message (possibly due to backhaul failure), or both. On receiving the failure report from the second base station 240, SON algorithm at the first base station 220 determines the time at which the failure event occurred by using the previous identity of the UE 180 in the serving first cell 200 to determine the time at which the request for handover was received from the UE 180 and the elapsed time until the failure event was included in the failure report message.

The SON algorithm uses the evaluated time at which the reported failure occurred and checks whether a failure condition on backhaul interfaces was detected in the period from when the UE 180 requested the handover until the time when the failure occurred. If such an event is detected, the SON algorithm at the serving first base station 220 can choose to ignore the received report as an input that triggers it to adjust the RAN parameters. If the SON algorithm evaluates that no backhaul failure events occurred during the period when the UE 180 was trying to handover to the target second base station 240, it can consider the failure report as a valid input to the SON algorithm, in which case radio access network optimisation is carried out (as in continuation step 120 of FIG. 2).

Essentially, this algorithm adds a step or a check before the start of the SON algorithm, which then deals with the optimisation of radio access network parameters. Existing SON solutions do not take into consideration the state of the physical transmission connectivity via the backhaul. Here, the SON solution's optimisation is preceded by such a check. It therefore becomes an integral part of the SON algorithm.

As noted, this step checks the status of the physical link connectivity of the base station (or equivalently Node B or eNodeB) at the point of evaluation. Alternatively, it checks the status of the physical link connectivity for historic failures, that corroborate with occurrences of failure reports that are used as an input to the SON algorithm. Either way, this check takes place before any optimisation is run on the base station. This results in an optimisation solution with a broader perspective and avoids wasting resources (manpower, hardware, software, etc) in optimising or correcting the network on a feature that might not require any change. This assists in speedy recovery from any network element malfunctioning and provides a more holistic view of the network in identifying problems and correcting them.

This incorporation of a flag, module or additional step or steps at the beginning of the Self-Organising Network algorithm or Engine checks the status transmission link and alerts if there a corrective action is required to improve the quality of the transmission connectivity of the Node B (base station) to the core network. This should have a positive impact on the CDR of the node, area or network as a whole. For example, if a high bit error rate (or other error rate) for a microwave link between the two base stations is present, the KPIs may start to show a downward trend. This may be the case even without a complete outage of the microwave link. The SON solution as adapted above will pick up this issue and begin to optimise the network accordingly. Connectivity may be re-routed or backup connectivity may be provided if one exists. If there is no backup, the radio access parameter optimisation may begin to be evaluated.

If the network does not have any microwave, copper or other wireless links and therefore may comprise only optical fibre links between base stations and the core network, the additional checking steps of the present invention may not be needed. However, that is unlikely to happen and it is therefore envisaged that this additional checking step will be useful and not wasted in most circumstances. That said, it is recognised that if only optical fibre connections exist to the node in order to provide backhaul connectivity, the additional checking steps may be ignored.

Although the specific embodiment has now been described, the skilled person will appreciate that variations and modifications are possible. For example, although the specific embodiment described above has focused on the possibility of microwave links being used for the backhaul interface, other kinds of wireless link may additionally or alternatively be provided. Also, other types of link with variable quality may be used, such as wire-based contention systems.

Indeed, it will be appreciated that more than one interface between each base station and other parts of the network (other network entities) may be provided in circumstances. Moreover, there may be more than one base station that is linked to the core network in some scenarios. Whilst alarms are considered above for informing the SON algorithm about the backhaul connectivity of a base station, other mechanisms may be possible as alternatives or additions, such as passing signaling information.

SON algorithms can be implemented using a range of different architectural approaches. These may include: distributed (in which the algorithm is independently run by each base station); centralised (in which one or more network entities run the algorithm for a plurality of base stations); and hybrid (a combination of distributed and centralised approaches). The implementation described herein are adaptable to all of these approaches.

The steps of the algorithm may be reordered and certain steps can optionally be omitted or combined. For instance, it may not be necessary to check whether a microwave backhaul link is present and performance degradation may simply be checked for regardless of the type of link. Rerouting the backhaul link can optionally be used when a high error rate is detected and resetting of the link can optionally be used in an outage scenario. Also, other types of corrective measure may be used when a degradation in performance is detected, such as adjustment of the backhaul link parameters such as power, modulation or similar. These may be applied in addition or as alternatives to resetting or rerouting the link.

The invention claimed is:

1. A method of self-optimisation for a base station within a cellular radio network, the base station having a first communication interface for providing a service to mobile terminals and a second communication interface for communication with other network entities of the cellular radio network, the method comprising:
   detecting, at a first time, a degradation in performance of the service provided over the first communication interface;
   identifying a reliability level for the second communication interface at the time of degradation in performance of the service provided over the first communication interface, wherein if the second communication interface has failed then identifying a report of a failure, at a second time, of the second communication interface; and
   implementing a network optimization procedure using a Self-Organising Network, SON, algorithm in dependence on the identified reliability level and in response to the detection of degradation, wherein the SON algorithm omits making changes to radio parameters upon determining that the degradation in performance is due to a physical failure of the second communication interface, and wherein the SON algorithm uses as input an indication of whether the failure of the second communication interface was the cause of the failure of the first communication interface based on a determined time interval between the first time and the second time.

2. The method of claim 1, wherein the step of implementing the SON algorithm comprises establishing a corrective measure for the degradation in performance.

3. The method of claim 1, wherein the step of identifying a reliability level for the second communication interface comprises determining a communications technology used for the second communication interface.

4. The method of claim 3, wherein the step of determining a communications technology used for the second communication interface comprises determining that the communications technology used for the second communication interface is wireless.

5. The method of claim 1, wherein the step of identifying a reliability level for the second communication interface comprises checking a communication status of the second communication interface.

6. The method of claim 5, wherein the step of checking a communication status of the second communication interface comprises identifying an outage of the second communication interface or determining that an error rate for the second communication interface meets a predetermined threshold.

7. The method of claim 6,
wherein the step of checking a communication status of the second communication interface comprises identifying an outage of the second communication interface; and
wherein the step of implementing the network optimisation procedure comprises establishing a corrective measure for the degradation in performance by rerouting the second communications interface.

8. The method of claim 6,
wherein the step of checking a communication status of the second communication interface comprises determining that an error rate for the second communication interface meets a predetermined threshold; and
wherein the step of implementing the network optimisation procedure comprises establishing a corrective measure for the degradation in performance by resetting the second communication interface.

9. The method of claim 8, wherein the step of establishing a corrective measure for the degradation in performance further comprises:
establishing a new error rate for the second communication interface, relating to a time period subsequent to the resetting of the second communication interface; and
rerouting the second communication interface if the new error rate for the second communication interface does not meet a predetermined threshold.

10. The method of claim 1, wherein the step of implementing the network optimisation comprises optimisation of one or more parameters of the first communication interface.

11. The method of claim 1, wherein the step of implementing the network optimisation comprises using the identified reliability level as a parameter of the SON algorithm.

12. The method of claim 5, wherein:
the step of detecting a degradation in performance of the service provided over the first communication interface comprises identifying a report of a failure in respect of the first communication interface at a first time;
the step of checking a communication status of the second communication interface comprises identifying a report of a failure of the second communication interface at a second time;
the method further comprises: comparing the first time and the second time in order to identify that the failure of the second communication interface was a cause of the failure of the first communication interface, the step of implementing a network optimization procedure being carried out on the basis of this identification.

13. The method of claim 1, wherein the step of detecting a degradation in performance of the service provided over the first communication interface comprises one or more of: monitoring a radio access bearer, RAB, establishment rate; and monitoring a call drop rate, CDR.

14. A computer readable hardware storage device, having stored thereon computer readable instructions, that when executed by a processor, are configured to carry out the method of claim 1.

15. A base station of a cellular radio network, comprising:
a first communication interface for providing a service to mobile terminals;
a second communication interface for communication with other network entities of the cellular radio network; and
a processor, configured to detect, at a first time, a degradation in performance of the service provided over the first communication interface, identify a reliability level for the second communication interface at the time of degradation in performance of the service provided over the first communication interface, wherein if the second communication interface has failed then identifying a report of a failure, at a second time, of the second communication interface, and implement a network optimisation procedure using a Self-Organising Network, SON, algorithm in dependence on the identified reliability level and in response to the detection of degradation, wherein the SON algorithm omits making changes to radio parameters upon determining that the degradation in performance is due to a physical failure of the second communication interface, and wherein the SON algorithm uses as input an indication of whether the failure of the second communication interface was the cause of the failure of the first communication interface based on a determined time interval between the first time and the second time.

* * * * *